US 11,758,073 B2

(12) United States Patent
Tröster et al.

(10) Patent No.: US 11,758,073 B2
(45) Date of Patent: Sep. 12, 2023

(54) METHOD FOR DETERMINING A COMPLIANCE FACTOR WITH REGARD TO THE COLOR COMPLIANCE OF A CREATED PRINTED PRODUCT WITH PREDETERMINED TARGET VALUES FOR COLORS

(71) Applicant: GMG GmbH & Co. KG, Tübingen (DE)

(72) Inventors: Philipp Tröster, Munich (DE); Eva Jüde-Löffler, Hamburg (DE); Marc Levine, Duxbury, MA (US); Darrian Young, Oceanside, CA (US)

(73) Assignee: GMG GmbH & Co. KG, Tübingen (DE)

( * ) Notice: Subject to any disclaimer, the term of this patent is extended or adjusted under 35 U.S.C. 154(b) by 0 days.

(21) Appl. No.: 17/706,639

(22) Filed: Mar. 29, 2022

(65) Prior Publication Data
US 2022/0377207 A1    Nov. 24, 2022

(30) Foreign Application Priority Data
May 23, 2021    (EP) .................................... 21175490

(51) Int. Cl.
*H04N 1/60*    (2006.01)
(52) U.S. Cl.
CPC ......... *H04N 1/6047* (2013.01); *H04N 1/6008* (2013.01); *H04N 1/6027* (2013.01)

(58) Field of Classification Search
CPC ... H04N 1/6047; H04N 1/6008; H04N 1/6027
See application file for complete search history.

(56) References Cited

U.S. PATENT DOCUMENTS

| | | | | |
|---|---|---|---|---|
| 5,333,069 A | * | 7/1994 | Spence | G03F 3/101 |
| | | | | 358/518 |
| 6,027,201 A | * | 2/2000 | Edge | H04N 1/6036 |
| | | | | 347/172 |
| 7,064,860 B1 | * | 6/2006 | Balasubramanian | H04N 1/40 |
| | | | | 358/1.9 |

(Continued)

FOREIGN PATENT DOCUMENTS

| | | | | |
|---|---|---|---|---|
| JP | 2016019288 A | * | 2/2016 | ............. G06F 3/122 |
| WO | WO-2011047831 A2 | * | 4/2011 | ........... H04N 1/6019 |

*Primary Examiner* — Ted W Barnes
(74) *Attorney, Agent, or Firm* — Gudrun E. Huckett

(57) ABSTRACT

For determining a match factor regarding color match of a printed product with target values for colors, measuring fields of a printout are spectrally measured and actual measured values of the printout recorded. The target values are compared with actual measured values by determining for the printed product a color value axis from a unique color value as a start point to a second unique color value as end point and interpolation points between the first and second unique color values; determining target values for start and end points and interpolation points; determining actual measured values for start and end points and interpolation points of the printout from the actual measured values; determining a distance value representing the distance between target value and actual measured value for each start point, end point, and interpolation point; and calculating and outputting the match factor as statistical average of the distance values.

7 Claims, 4 Drawing Sheets

(56) References Cited

U.S. PATENT DOCUMENTS

| | | | | |
|---|---|---|---|---|
| 9,471,858 B2* | 10/2016 | Bestmann | ........... | G06K 15/1878 |
| 10,009,517 B1* | 6/2018 | Widener | .............. | H04N 1/6033 |
| 2001/0030758 A1* | 10/2001 | Wendt | ................. | B41F 33/0036 |
| | | | | 358/1.9 |
| 2004/0130739 A1* | 7/2004 | Adam | ................ | H04N 1/00047 |
| | | | | 358/1.9 |
| 2009/0087090 A1* | 4/2009 | Gregory, Jr. | ......... | H04N 1/6033 |
| | | | | 382/167 |
| 2011/0032546 A1* | 2/2011 | Dalal | ................... | H04N 1/6033 |
| | | | | 358/1.9 |
| 2012/0250095 A1 | 10/2012 | Bestmann | | |
| 2012/0257227 A1* | 10/2012 | Wurster | .............. | H04N 1/6019 |
| | | | | 358/1.9 |
| 2017/0048421 A1* | 2/2017 | Morovic | ............. | H04N 1/6016 |
| 2017/0113454 A1 | 4/2017 | Hoffstadt et al. | | |

* cited by examiner

METHOD FOR DETERMINING A COMPLIANCE FACTOR WITH REGARD TO THE COLOR COMPLIANCE OF A CREATED PRINTED PRODUCT WITH PREDETERMINED TARGET VALUES FOR COLORS

BACKGROUND OF THE INVENTION

The present invention relates to a method for creating an objective evaluation standard for evaluating printed products.

Today's state of the art for the production of printed products essentially comprises the following:

After a printed product has been "designed," technical marginal parameters are determined. These include determining the press on which the printed product will ultimately be printed. The press in turn specifies technical boundary conditions. For example, it has a predefined number of inking units, i.e., it can process a certain number of colors. In addition, the inking units are in a predefined sequence, which also determines the way in which colors can be printed consecutively on top of each other. In addition, the printing press to be used automatically specifies the printing process to be used, which is also referred to as the "target printing process". For example, this can be an offset printing process. Furthermore, it is specified on which carrier the printed product is to be created.

The template for the printed product itself first of all reveals which final colors are to be achieved. In other words, a certain number of color appearances results in the printed product. This can be broken down into individual printable dots, for example, and for each individual printable dot it can be specified what color it should end up bearing. This pixel-like processing is common.

These results, known as final colors, can be defined in a technically unambiguous way. For example, they have a unique spectrophotometrically measurable value.

Also state of the art is the knowledge about the composition of colors. Any measurable color can be specified from the mixture of a few colors. "Mixing" in the sense of the present invention does not necessarily mean creating a mixture or suspension in the sense of dumping colors together in certain proportions, but it usually means creating a "final color" by overprinting given colors in given amounts and a given order. This is referred to as mixed intention or color intention.

Well-known printing color systems, for example defined by the process colors CMYK (Cyan, Magenta, Yellow, Black) have now been developed to such an extent that measurable colors can be transferred into the respective color space. By printing the CMYK process colors on top of each other in a specified sequence and with a specified percentage, it is possible to create a color impression that is as close as possible to a specified color.

It is obvious here that, on the one hand, the number and sequence of inking units in the printing press with which the printed product is to be produced and, on the other hand, the mixing intentions resulting from the color analysis, i.e., the specifications of the sequence and quantity proportions of available colors to be printed on top of each other, must be coordinated.

Another important aspect that influences the appearance and quality of a printed product is the substrate on which it is to be printed. The printing paper, how white it is, any coloring, structure, absorbency and the like can have a considerable influence here.

All these parameters, such as printing press, printing process, ink types, number of inks, printing paper, etc., are referred to as printing process parameters. Printing process parameters frequently used in practice are partly standardized in international standards. For example, the color properties of the process colors and the inking of the papers, along with other parameters for different paper classes, are specified in ISO standard 12647-2 (Process Standard Offset Printing) for the offset printing process.

Once the printing process parameters have been defined for a planned printing operation, a data set representing the printed product is generated, which can be converted by the intended printing press to produce the printed product. The machine then prints the intended quantities of available colors pixel by pixel in the appropriate sequence, thus automatically generating the desired product.

A printing process can be recorded metrologically by spectrophotometrically measuring the color mixtures that have been printed on the printed sheet. The reflectance spectrum of a color mixture is then known and thus the color impression defined. In practice, often only a characteristic number of color mixtures are measured in order to limit the time required to a reasonable level. For the standardized printing conditions mentioned above, such measurements are often already available as state of the art and have been published accordingly (e.g., FOGRA 51).

For a printing process with given printing process parameters and thus also for a print data set generated for this printing condition, spectrophotometrically measured target values, i.e., the reflectance spectra of the individual ink mixtures, are thus available. For better comprehensibility and clarity, the spectral target values are often converted into CIE-L*a*b* values. This color system defined by the CIE commission arranges different color impressions in a 3-dimensional space. The coordinate system used for this defines the individual color locations based on their brightness (L*), their position on a green-red axis (a*) and their position on a blue-yellow axis (b*). By definition, the coordinate system is constructed so that the Euclidean distance in this space correlates with human perception for color differences. If the color locations of two colors are close together in this coordinate system, they are hardly distinguishable for our human perception system. This is independent of which color mixture was used for printing. In other words, there can be different color mixtures that result in an identical or indistinguishable color impression in the human perception system.

According to the state of the art, the perceptible color difference is often expressed as a so-called delta-E 76 value. This value designates the Euclidean distance in the CIE-L*a*b* space. Recent developments according to the state of the art have improved the calculation in the so-called delta-E 2000 formula. Color distances calculated using this formula correspond even more closely to perceptual perception across all color ranges. For example, we perceive color differences in the yellow areas of the CIE-L*a*b* system less strongly than described by the spatial distance there.

In summary, according to the prior art, for a print data set defined for a known set of printing process parameters, a target value corresponding to the human color impression can be measured for each color mixture and thus defined or read from published measurements. This setpoint can be expressed as a chromaticity coordinate in a CIE-L*a*b* sensitive coordinate system.

For a wide variety of reasons, it sometimes happens that the printing process parameters have to be changed. For example, it may be that a printing process has to be changed.

For organizational reasons, it may be necessary or desirable to print at a different location, in a different country, on a different press, using a different process, and so on. Thus, the data set representing the printed product must be changed, i.e., usually transformed. There are various procedures for this, which as a rule always result in color space transformations being carried out. These color space transformations are used to describe new color mixtures for the modified printing process, which are supposed to correspond to the color impression of the original mixture of the original printing condition. In practice, the question now arises as to how close the printed product comes to the desired result after the transformation has been carried out.

In the following explanations, the printing process with the changed printing process parameters is referred to as the target printing process, in the sense that this printing process represents the target of the transformation and also in order to clearly distinguish it from the source printing process, i.e., the original printing process with its set of process parameters. In the same way, we speak of a source print data set and a target print data set.

In the prior art, it is known and customary to check the result of a transformation by comparing it with the original. If it is assumed that a master exists which corresponds to the requirements of the user, the target values for colors of the source print product to be printed in a defined color space can be determined by measurements. The source printing process parameters on which the target result is based, i.e., the print data, are also known. The printing process parameters of the planned target printing process are also known. A transformation process is now selected, of which there are usually different ones. The next step is to transform the print data set for the print product to be printed for use in the target printing process using the specified transformation method.

If one now generates a printout of the print product together with measurable fields in the target printing process, one can measure these spectrally, from which the actual values result. One can now compare the target values with the actual values and thus make an evaluation.

If this process is repeated using a different transformation method, it is possible to determine which transformation method is the most suitable for the planned process.

For the evaluation of the transformation method, known procedures are available according to the state of the art. Very often, the transformation process is evaluated by means of visual sampling. In this process, the prints of a source data set are visually compared with the transformed and also printed variants from the target printing process and evaluated by experts. Known motifs that have been classified as suitable are used. The image data set "Roman 16" provides a set of such motifs. A characteristic feature of this set of motifs is that individual color areas dominate in the individual images. This makes it possible to evaluate the quality of the transformation process in individual color areas separately and also the quality in neutral gray tones in the medium brightness range independently of dark and saturated tones. The set of motifs can also be extended to include motifs that reflect the use of spot colors, as are frequently used in packaging printing. Here, too, the motifs can be structured in such a way that individual quality aspects can be evaluated separately. Ultimately, however, such an evaluation is time-consuming, often requires a large number of experts and is strongly subject to the subjective criteria of the observers.

As explained above, the target values can be determined spectrophotometrically for a source print data set and the corresponding color locations can be specified in the perception-specific CIE-L*a*b*. In the same way, actual values can be determined for the transformed target print data set. According to the prior art, the difference in perception can now be calculated for each individual color mixture by a delta-E 2000 value. The visibility threshold is generally specified as values less than 1, i.e., if only values less than 1 can be determined for the color mixtures in the comparison, the transformation procedure has a high quality that the target print data set is not visually different from the source data set. However, this simple procedure, a method of statistical evaluation of all color differences of all color mixtures, reaches its limits if the target printing process is not able to map all color locations of the source print data set due to its physical properties. The overall statistics can then no longer be pushed down to values below the visibility threshold by a theoretically optimal process, and thus individual or even several major differences distort the statistics and thus the comparability and evaluability.

As an example of this, consider a print on a heavily modified target stock. The source data set was prepared for a bright white image printing paper. It is now printed on a brown cardboard. In the target printing process, it is therefore no longer possible to achieve all the light color mixtures of the source data set. Even the unprinted area already has high visible differences that can no longer be resolved even by a transformation process. According to the state of the art, a media-relative comparison can be carried out in this case. In this process, the target values to be achieved are transformed in such a way that the differences in the unprinted target stock are eliminated. The quality of the transformation process can then be evaluated using statistical methods. This evaluation procedure is described, for example, in Fogra's Process Standard Digital (PSD). However, even the state of the art media-relative evaluation method has considerable weaknesses if the achievable color gamut of the target printing process is further severely restricted. Color gamut is understood as the set of all possible color locations achievable by a set of printing process parameters.

An example of such a limitation is the darker and/or colored substrate mentioned above. In this case, the color gamut in this range is already severely limited. If, for example, the process colors can no longer be applied with the same intensity or overprinted in the same quantity in the target printing process, the range of all colors that can be represented shrinks further. The smaller the color gamut of the target printing process, the more the merely statistical consideration of color distances after the transformation becomes less important. For example, it is possible to map many color locations of a source print data set into a single color location in the target print data set if the target print data set does not contain these color locations in its color gamut. Statistically, such a transformation can have a smaller overall or even average error and thus evaluate a transformation better in terms of its goodness than an alternative transformation, which in this case preserves the distinctness of the color locations of the source print data set, but thus leads to a higher error in terms of the pure considerations of the deviation. An expert who performs a visual evaluation of the transformation, as described above, would in this case rate the alternative transformation as better. Here, therefore, the objective methods known according to the current state of the art are inferior to an expert in their evaluation.

Based on the state of the art described above, there is a considerable need to be able to determine an evaluation of printed products that is as measurable and objective as possible after the data set representing the printed product has been changed, in order to also be able to concretely evaluate the distance to the target, whereby individual influences and subjective evaluation impressions can be largely excluded. In this context, the method must also sensibly include target printing process parameters in its evaluation statement, which have a considerably smaller color gamut in relation to the source print data set.

SUMMARY OF THE INVENTION

It is the task of the present invention to provide a method for determining a compliance factor (match factor) with respect to the color compliance (color match) of a created printed product with predetermined target values for colors.

To solve this task, a method for determining a match factor is proposed and comprises the steps:
- determining the target values for colors of the printed product to be printed in a defined color space,
- identifying the print data set predetermined for a target printing process,
- transforming the print data set for the printed product to be printed for use in the target printing process using a specified transformation method,
- generating a printout of the print product together with measurement patches of this print in the target printing process,
- spectrally measuring the measuring fields of the printout according to d) in order to record the actual values,
- comparing the target values with the actual values, wherein the method is characterized by the following steps:
- determining a color value axis from a unique color value (start point) to a second unique color value (end point) with simultaneous determination of the interpolation points selected between the two color values,
- determining the target values for the start point, the end point and the interpolation points,
- determining the actual values for the start point, the end point and the interpolation points,
- determining a distance value representing the distance between the target value and the actual value for each of the start point, the end point, and the interpolation points,
- calculating and outputting a match factor as a statistical average of the distance values.

Further advantages and features of the invention result from the dependent claims.

Start and end points of both the target values and the actual values can be brought into congruence by a normalization, resulting in a transformation rule, and the interpolation points of both the target values and the actual values are subjected to the same transformation rule, the resulting distances of the actual values from the target values of the supporting points being used as distance values for determining the congruence factor.

A plurality of color axes can be defined for a printed product and processed according to the steps disclosed above. A resulting factor is formed statistically from a plurality of match factors.

The printed product selected is one which comprises, in particular, the process colors CMYK. The printed product selected is one which in particular comprises a spectrum of a spot color.

The start point is a clearly identified printed product which is unambiguously defined with regard to the final color appearance. Usually, for each individual pixel, the color appearance is specified in a perceptually specific and print-independent color system. One such suitable color system is, for example, the CIEL*a*b* system. There is a print data set for this uniquely identified print product.

It should be noted here only in passing that common printing processes are often standardized with regard to their printing process parameters, such as paper, inks, ink sequences and the like. For these standardized printing processes, idealized values for color appearance are often published. For example, the FOGRA51 data set for offset printing on class 1 image printing paper of ISO standard 12647-2.

Usually, the target printing process is now specified and a transformation process is selected. These processes are implemented by people involved in printing. The target printing process is usually largely predetermined due to availability, organizational or even design motives. Various transformation processes are then used to transform the existing print data into the print data required for the planned printing in the output printing process. Printing is then carried out and the result measured to determine actual values. Just as the target values, the actual values are measured spectrophotometrically and CIEL*a*b*-color system is transformed.

According to the invention, a color value axis is now formed. For this purpose, an axis from one unique color value (start point) to a second unique color value (end point) is determined while simultaneously determining the interpolation points selected between the two color values. This is also done by a person involved in printing, using a computer to which the relevant data is available. This selection can also already be made in connection with the selection of the uniquely identified print product.

From the set of target values for the uniquely identified print product, a computer now automatically determines the target values for the start point, the end point and the interpolation points. From the set of measured values for the product printed and measured in the target printing process, the actual values for the start point, the end point and the interpolation points are taken by the computer. The distance between the target value and the actual value can now be determined automatically for each of the start points, end points and support points, and thus a distance value representing this distance can be determined. In this first evaluation, the distance is advantageously determined using delta-E 2000 formula, since this comes closest to human perception.

A match factor can now be calculated as a statistical mean value from the distance values and output. According to the invention, percentages are used here. Thus, a single distance value can be expressed as a percentage value. If the target value and the actual value are completely in agreement, the agreement is 100%. Accordingly, deviations can be indicated as a percentage value. The color value axis can now be used to average the distances available as a percentage value, resulting in a value. This value represents the color conformity of the printed product with specified target values for colors.

The next step in the invention is to perform a coordinate transformation of the measured values. This coordinate transformation maps the respective start points of the color axes to each other, as well as the end points of the color axes. The interpolation points in between are changed by the same transformation rule. Now the Euclidean distance of the points can be determined for the interpolation points in the coordinates transformed in such a way. The distances can be transformed in the same way into a percentage notation and averaged. This results in a further match factor. This evaluates the extent to which color distances between the interpolation points along the color axis in the target print product were obtained by the color space transformation to be evaluated. If the two match factors for the color axis are averaged, the result is a final value that describes both the color match of the created print product with specified target values and the preservation of the original color distances between the interpolation points of the color axis. This aspect in particular, which also evaluates the so-called modulation of the colors of the printed product, is decisive for an objective evaluation of the transformation process and the resulting printed product in the target printing process.

Since a specific transformation process has been used, it is now possible to make an objective comparison between different transformation processes. If the same procedure using a different transformation process results in a different match factor, this provides an objective measure of the suitability of the transformation process for transforming print data in relation to the specific target printing process.

Such findings can be stored and retrieved in databases, from which the respective suitable transformation processes can be specifically selected for future printing processes. Determined quality values can be stored together with the information about the printing process, the number of colors and color selection and the respective data treatment process for preparing the print values are stored in a database in such a way that they can be retrieved. For a planned printing project, the selection of a suitable data treatment method for preparing the print values is carried out by evaluating the database information.

According to a further suggestion of the invention, additional color axes can be formed and evaluated according to the method described above. This makes it possible to include all relevant color areas of the printed product in the evaluation by forming separate axes for the respective color areas with suitable start and end points and the corresponding interpolation points. For the example of the "Roman 16" motifs, the colors dominating in each motif can be placed on the axes as already specified there and then evaluated according to the method proposed in the invention.

Furthermore, according to the invention, the match factors of all color axes can be converted into one match factor. In accordance with the invention, it is advantageous to weight different color areas differently. In the same way, the weight that is applied to the two values for each color axis when determining the match factor can be changed depending on the color range. For example, this allows the modulation to be weighted more heavily in the case of a gray color axis, and the color match to be weighted more heavily in the red range. The scheme used to distribute the weights over the different color axes allows an objective and clearly defined evaluation of the printed product.

Instead of an arbitrary check of target/actual comparisons, a specific value is now determined by a concrete specification of a check quantity.

As already mentioned, the standard templates mentioned and described at the beginning, for example the "Roman 16" motifs based on the process color, are suitable as print products. These templates can now also be used according to the method according to the invention for determining a match factor.

According to a particularly advantageous proposal of the invention, templates can be designed that also include spot colors in the design of the source printed product. For example, the process colors CMYK can be supplemented by one or more defined additional colors. For example, Pantone color ranges are known for which clear target values are available. Accordingly, templates for printed products can be developed which, when the determination method according to the invention is used, allow specific statements to be made about the suitability of a particular transformation method for particular printing processes. For example, when certain brown tones are used in packaging printing on a certain type of press, the use of only certain transformation processes can be determined. The ability to evaluate the transformation of spot colors from the source printing process to the target printing process is particularly important when this is a digital printing process. Within digital printing processes, very often no spot colors are used, but an extended fixed set of colors. For example, the process colors CYMK are supplemented by orange and green. This means that the spot colors are necessarily changed by the transformation process. In this respect, evaluation on the basis of the match factor according to the invention is very important, since the quality of the printed product produced in the target printing process depends not only on the color match of the spot color, but also its color gradations represent an essential criterion for quality.

The invention proposes a method which makes it possible to determine a match factor which is independent of individual or subjective influences. This match factor provides information on the color match of a printed product with respect to a clearly identified and color-defined original. Since the print data of the template for output of the print product in the target printing process has been transformed by using a data transformation process, the match factor indicates a value for the suitability of the transformation process for the specific printing process.

This means that printing processes can be optimized quickly and specifically in the future by using the most suitable transformation process in each case. The inks used, base systems and special inks, overprinting regulations and mixing intentions, the printing substrates and their inks, the printing process, the press and so on can all be taken into account. Thus, if in the future one has any printed product reproduced by the printing data with respect to a certain printing process, the respective suitable transformation process can be identified in order to be able to produce this printed product in a deviating printing process, whereby the greatest possible color identity or color fidelity is achieved.

The method according to the invention is carried out automatically after the specifications have been recorded and automatically generates a final value in the form of the match factor. It solves the technical task of obtaining a reliable evaluation standard that is free of individual and subjective influences, in order to be able to make well-founded decisions about processes to be used.

BRIEF DESCRIPTION OF THE DRAWINGS

Further advantages and features of the invention will be apparent from the following description based on the figures.

DESCRIPTION OF PREFERRED EMBODIMENTS

As already explained, the formula commonly used in industry to determine color differences is the DeltaE formula. This formula describes the Euclidean distance in the so-called CIEL*a*b* color space, or the improved formula DeltaE 2000 If two points in this space are so close together that their distance is less than one (DeltaE<1), they are no longer visually distinguishable. If one now reproduces a motif, whose pixels expressed as Lab values represent the reference data set, on a different output system (different printer, different format, different inks, etc.), a test data set of CIEL*a*b* values is created. If each pixel is reproduced down to DeltaE<1, no visual difference between the original and the reproduction can be perceived and an optimal reproduction is obtained.

However, the output system usually defines physical constraints that make such an optimal reproduction impossible. The best example here is a substrate that has a different coloration than the reference. If, for example, a motif is printed on yellow newsprint, an exact reproduction of the CIEL*a*b* value, i.e., a DeltaE<1, is impossible for many pixels. Thus, while the DeltaE formula may indicate that one cannot achieve identical reproduction, it does not provide a measure of optimal reproduction within the physical constraints on a particular output system. Such a formula has been developed by GMG.

According to the invention, it is necessary to determine the extent to which the spatial relationships in which the pixels of the reference data set are related to each other are reproduced in the test data set. For this purpose, selected color values (these are arranged as measurement fields next to the images) from the reference data set, as well as the corresponding values from the test data set, are subjected to a transformation into a new coordinate system. Here two points are selected, which are mapped in the new coordinate system to the origin, and/or to the point (x=100,y=0,z=0). All other points are subjected to an appropriate transformation into this new three-dimensional space. In this, the relative distances between the reference and test datasets can now be both measured and visually displayed. The metric is designed in such a way that if all points lie on top of each other after the transformation, the best possible test data set has been achieved, since the relative spatial relationships have been preserved. Deviations from this optimal representation can now in turn be specified as the Euclidean distance in this new space between each reference point and its replica (the test data set).

Figure 1:
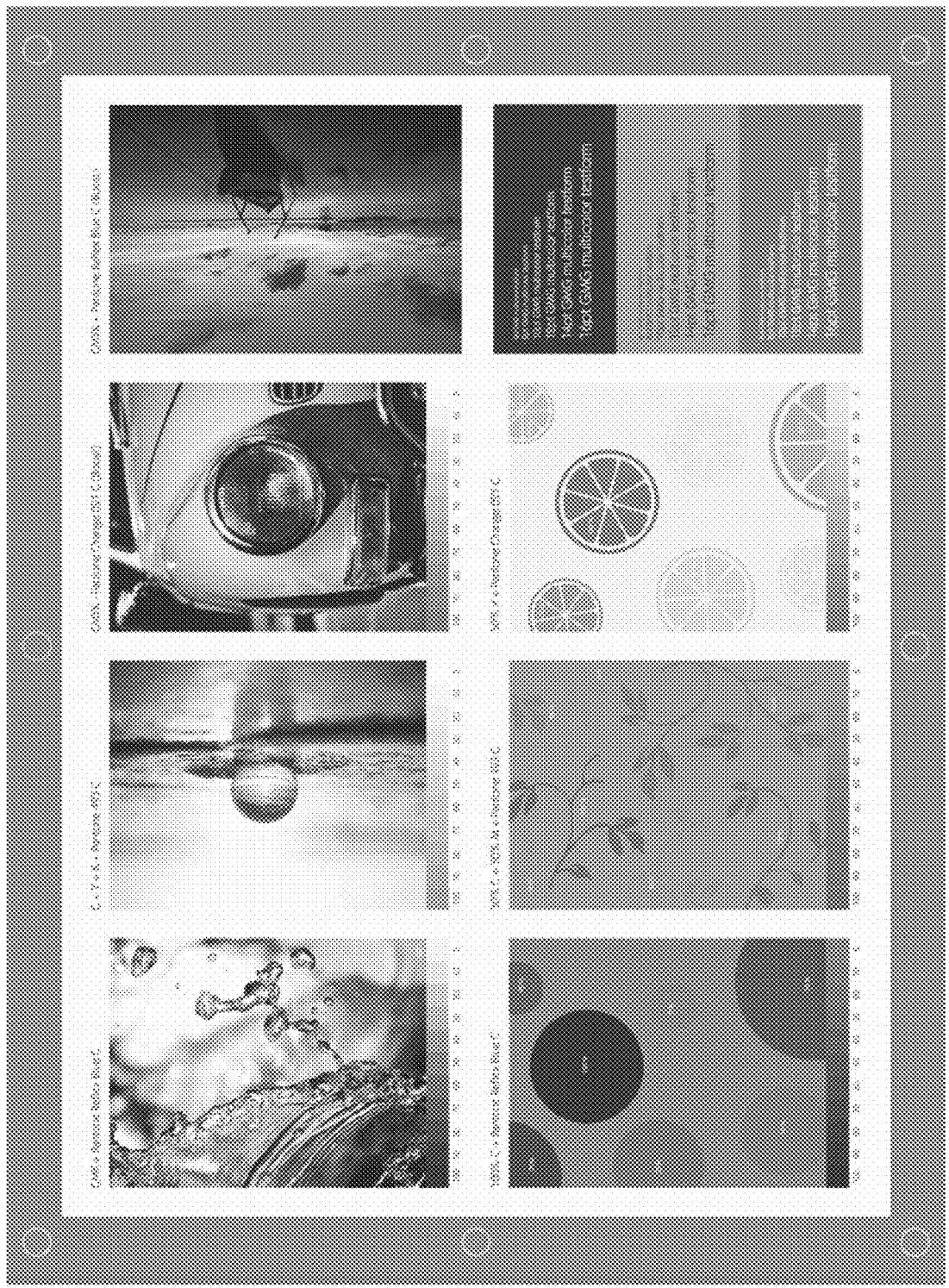
FIG. 1 shows an exemplary representation of a printed product comprising process colors CMYK and spot colors as well as the patch fields as a basis for target values.

FIG. 1 shows an example of templates formed from combinations of process colors CMYK and uniquely identified spot colors. The measuring fields of the individual illustrations represent the color ranges relevant for this image and thus the axes formed in the sense of the invention. These represent the target values for the respective colors. For each of the images, there exists a unique print data set which, in accordance with the application, is transformed into the desired target printing process using a transformation process. The transformed data is then printed in the target printing process and the measuring patches are measured spectrophotometrically accordingly. This results in the actual values.

Figure 2:
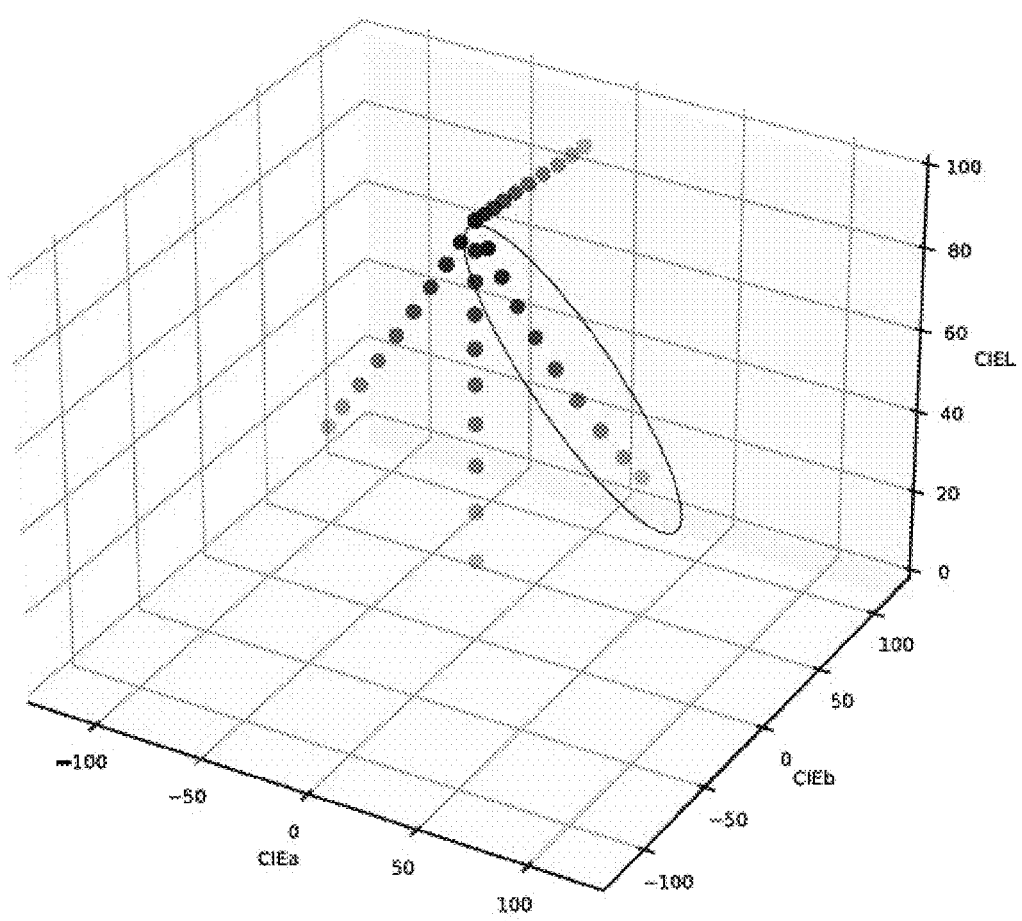
FIG. 2 shows a schematic representation of a three-dimensional CIEL*a*b* coordinate system with color axes according to the invention.

FIG. 2 shows a three-dimensional CIEL*a*b* based coordinate system to represent the color axes for different color ranges. For each of the color axes, a start point, an end point and intermediate interpolation points are defined. In this coordinate system, on the one hand the target values and on the other hand the actual values of each color axis are positioned. The distances can be specified as described above as Euclidean distance in this space between the individual reference points on the one hand and their reproduction on the other hand.

Figure 3:
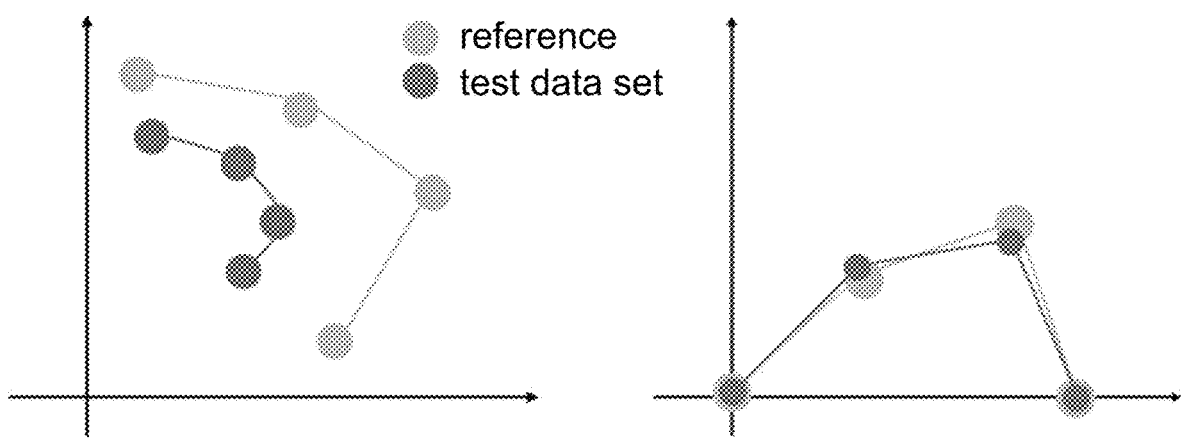
FIG. 3 shows a schematic representation of a standardization for the distance determination.

This principle is shown in FIG. 3. On the left side, the reference data set is shown in blue in the CIEL*a*b* color space. This must be reproduced on an output system that has a smaller color space due to physical limitations and thus forces a visible color difference (DeltaE>>1). The test data set is shown in red. On the right side it can be seen how by normalizing the point at the top left to the coordinate origin, and the point at the bottom right to the coordinates x=100, y=0, a representation can be obtained which shows how well the relative spatial relationships are preserved.

Figure 4:
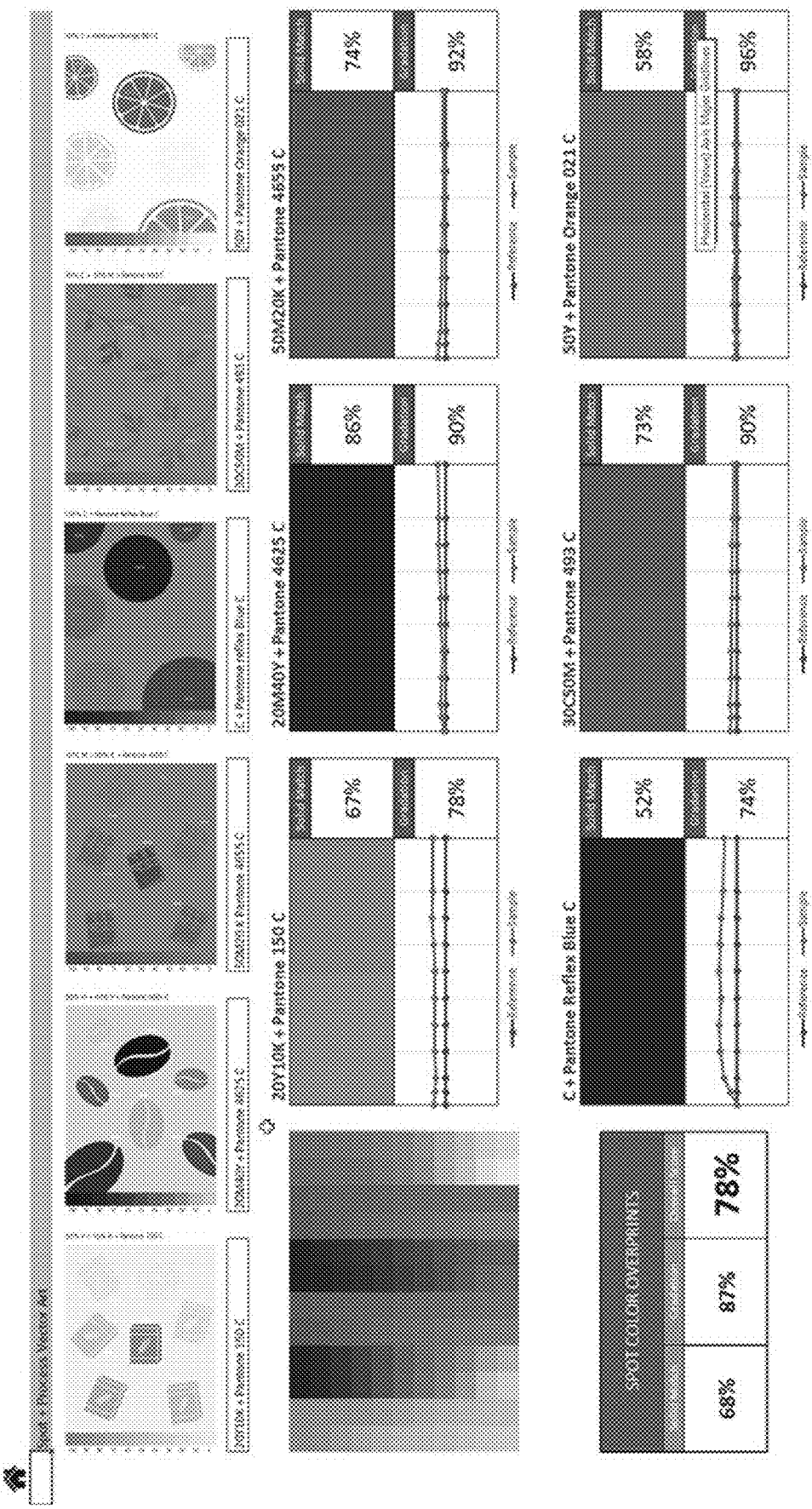
FIG. 4 shows an exemplary representation for a result of a determination of a match factor.

FIG. 4 shows the result of the procedure according to the invention. For the individual color areas based on the prints of clearly identified originals, the distances can be given as percentage values. Different values result depending on whether the values are evaluated absolutely as a distance over the entire color axis or relatively according to a normalization according to the invention. The individual values of the color ranges can now be combined into an overall value, which in the case of the present example is 86%. This value represents the match factor that results when the selected transformation method is used to produce a printed product in a specific target printing process. If the same procedure is now repeated using a different transformation process, unambiguous and comparable final values are obtained, enabling the appropriate process to be selected objectively.

The described embodiments are for explanatory purposes only and are not limiting.

The specification incorporates by reference the entire disclosure of European priority document 21 175 490.8 having a filing date of May 23, 2021.

While specific embodiments of the invention have been shown and described in detail to illustrate the inventive principles, it will be understood that the invention may be embodied otherwise without departing from such principles.

What is claimed is:

1. A method for determining a match factor with respect to a color match of a produced printed product with target values for colors, the method comprising:
 a) determining target values for colors of a printed product to be printed in a defined color space,
 b) identifying a print data set predetermined for a target printing process,
 c) transforming the print data set for the printed product to be printed for use in the target printing process by using a specified transformation method,
 d) generating a printout of the printed product to be produced together with measuring fields by the target printing process,
 e) spectrally measuring the measuring fields of the printout and recording actual measured values of the printout,
 f) comparing the target values with the actual measured values by:
  f1) determining for the printed product to be printed a color value axis from a unique color value as a start point to a second unique color value as an end point and simultaneously determining interpolation points selected between the first and second unique color values, f2) determining target values for the start point, the end point, and the interpolation points of the printed product to be printed, f3) determining actual measured values for the start point, the end point, and the interpolation points of the printout from the actual measured values of step e), f4) determining a distance value representing the distance between the target value and the actual measured value for each of the start point, the end point, and the interpolation points, f5) calculating and outputting the match factor as a statistical average of the distance values;

and further comprising:

bringing into congruence the start points and the end points of both the target values and the actual values by a normalization, resulting in a transformation rule;

subsequently subjecting the interpolation points of both the target values and the actual values to the transformation rule; and using the resulting distances of the actual measured values from the target values of the interpolation points as distance values for determining a congruence factor.

2. The method according to claim 1, further comprising defining in step f1) a plurality of the color axis for the printed product to be printed and processing the plurality of the color axis according to steps f2) to f5) so that a plurality of the match factor are provided.

3. The method according to claim 2, further comprising statistically forming a resulting match factor from the plurality of the match factors.

4. The method according to claim 1, further comprising selecting the printed product to be produced to comprise process colors CMYK.

5. The method according to claim 1, further comprising selecting the printed product to be produced to comprise a spectrum of a spot color.

6. The method according to claim 1, further comprising retrievably storing in a database determined quality values together with information about a printing process, a number of colors and color selection, and a respective data treatment process for preparing print values.

7. The method according to claim 6, further comprising selecting a suitable data treatment process for preparing the print values for a planned printing project by evaluating the information stored in the database.

* * * * *